UNITED STATES PATENT OFFICE.

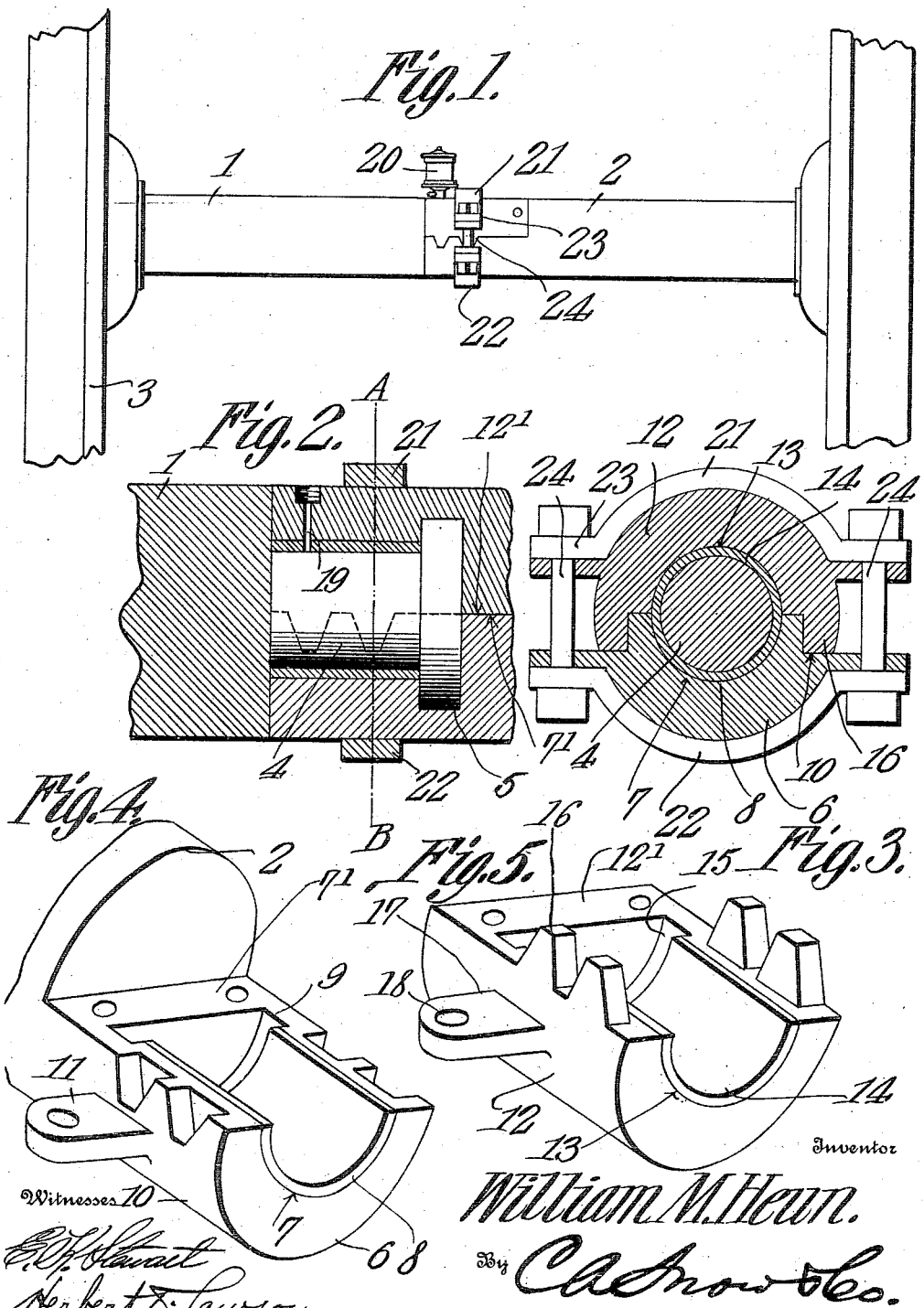

WILLIAM M. HEUN, OF HASTINGS, NEBRASKA.

AXLE.

985,808.　　　　　Specification of Letters Patent.　　Patented Mar. 7, 1911.

Application filed December 8, 1910.　Serial No. 596,301.

*To all whom it may concern:*

Be it known that I, WILLIAM M. HEUN, a citizen of the United States, residing at Hastings, in the county of Adams and State of Nebraska, have invented a new and useful Axle, of which the following is a specification.

This invention relates to axles and is particularly designed for use upon locomotives, although it is equally adapted for use upon cars, automobiles, and other vehicles.

As is well known, when two wheels are secured to the ends of and rotate with, an axle, one of the wheels slides to a greater or less extent when the vehicle supported thereby is traveling around a curve. This is especially noticeable in connection with the drive wheels of locomotives.

The object of the present invention is to provide a shaft made up of movably connected sections disposed in alinement and having novel means whereby they may be rigidly connected at their meeting ends.

A further object is to provide a coupling of novel form for connecting the shaft sections, the parts of said coupling being readily detached for the purpose of separating the sections.

With these and other objects in view, the invention consists of certain novel details of construction and combinations of parts hereinafter more fully described and pointed out in the claims.

In the accompanying drawings the preferred form of the invention has been shown.

In said drawings:—Figure 1 is a front elevation of an axle constructed in accordance with the present invention, portions of the wheels being shown thereon. Fig. 2 is an enlarged longitudinal section through the coupled ends of the shaft sections. Fig. 3 is a section on line "A—B" of Fig. 2. Fig. 4 is a perspective view of the coupling member upon one of the axle sections. Fig. 5 is a perspective view of the detachable coupling member.

Referring to the figures by characters of reference 1 and 2 designate the two sections of the axle, each section having a wheel 3 mounted upon its outer end. Section 1 of the axle has a cylindrical stem 4 extending from its inner end and concentric with the section. This stem has a circular head 5 at its free end. The axle member 2 has a coupling member extending from its inner end, said member being substantially semi-cylindrical in outline and provided with a semi-cylindrical seat 7 extending longitudinally therein and preferably lined as indicated at 8 with brass or other suitable material, there being a diametrical shoulder 7' at the inner or closed end of the seat. That end of the seat adjoining the end of the axle section 2 is enlarged as indicated at 9 so as to receive and retain the head 5 of the stem 4, which stem is designed to bear within the recess 7 and upon the lining 8. Tapering recesses 10 are formed within the longitudinal edges of the coupling member 6, and ears 11 extend in opposite directions from said member as clearly indicated in Fig. 4.

In order that the stem 4 and head 5 may be held in engagement with the coupling member 6 and the two axle sections 1 and 2 held together, a removable coupling member such as shown in Fig. 5 is employed. This member, which has been indicated at 12, is substantially semi-cylindrical in form and has a longitudinally extending semicylindrical recess 13 therein provided with a lining 14 of brass or other material, there being a solid end portion 12' bearing on and bolted or otherwise secured to the shoulder 7'. One end of this recess is enlarged as indicated at 15 so that when the coupling member 12 is seated upon the coupling member 6 the head 5 of stem 4 will extend into this enlarged portion 15. Tapering projections 16 extend from the longitudinal edges of the coupling member 12 and are designed to be seated within the recesses 10 when the parts are assembled. Ears 17 extend in opposite directions from the coupling member 12 and these ears as well as the ears 11 heretofore referred to have openings 18 therein designed to register when the parts are assembled. An oil duct 19 extends through the coupling member 12 and opens into an oil cup 20 of any suitable form mounted upon the coupling member 12.

The means employed for binding the two coupling sections 6 and 12 together consist of two oppositely disposed arcuate straps 21 and 22, provided with terminal ears 23 designed to receive bolts 24 extending through the openings 18. By tightening these bolts 24 the ears 11 and 17 can be drawn toward each other so as to cause the two coupling sections 6 and 12 to be firmly bound together. When these sections are thus secured it becomes impossible for the two axle sections 1 and 2 to be separated, although, as will be obvious, said sections are permitted to rotate independently of each other. To separate the two sections 1 and 2 it is merely necessary to remove the bolts 24 whereupon the coupling member 12 can be lifted out of engagement with the coupling member 6 and the stem 4 and head 5 disengaged from said coupling member 6.

It will be seen that the device herein described constitutes a very efficient and durable coupling between axle sections, and by reason of its strength and compactness it is especially adapted for use not only upon the axles of the drive-wheels of locomotives but also upon the axles of automobiles and similar vehicles, as well as in connection with street car service, where very short curves are frequently employed.

What is claimed is:—

1. An axle comprising alining sections, a coupling member extending from one of the sections, said member having a seat, a stem extending from the other axle section and bearing in the seat, said stem having an enlargement, engaging the coupling member, a detachable coupling member having a recess for the reception of the stem and its enlargement, coöperating means upon the meeting portions of the coupling members for holding said members against independent longitudinal movement, and means for detachably securing the coupling members together.

2. An axle comprising alining sections, a coupling member integral with and extending from one end of one of the sections, said member having a recess, a stem extending from the other section and bearing within the recess, said stem having a head engaging the coupling member, a detachable coupling member interposed between the axle sections and having a recess for the reception of a portion of the stem and head, means for detachably securing said coupling members together, and projections upon one of the coupling members and detachably engaging the other coupling member.

3. An axle comprising alining sections, a coupling member integral with and extending from one end of one of the sections, said coupling member having a longitudinal recess constituting a seat, a stem extending from one end of the other axle section and bearing within the recess, said stem having a head engaging the coupling member, a detachable coupling member having a recess for the reception of the stem and its head, projections upon one of the coupling members and detachably engaging the other coupling member, and means for detachably securing the coupling members together.

In testimony that I claim the foregoing as my own, I have hereto affixed my signature in the presence of two witnesses.

WM. M. HEUN.

Witnesses:
LEM TIBBETS,
HENRY B. HUCKFELDT.

---

Copies of this patent may be obtained for five cents each, by addressing the "Commissioner of Patents, Washington, D. C."